(12) United States Patent
Van Oldenborgh et al.

(10) Patent No.: US 11,308,358 B2
(45) Date of Patent: Apr. 19, 2022

(54) METHOD AND SYSTEM FOR AUTOMATICALLY ANNOTATING AND IDENTIFYING A LIVING BEING OR AN OBJECT WITH AN IDENTIFIER PROVIDING A SUBJECT IDENTIFICATION

(71) Applicant: KEPLER VISION TECHNOLOGIES B.V., Amsterdam (NL)

(72) Inventors: Marc Jean Baptist Van Oldenborgh, Amsterdam (NL); Cornelis Gerardus Maria Snoek, Amsterdam (NL)

(73) Assignee: KEPLER VISION TECHNOLOGIES B.V., Amsterdam (NL)

( * ) Notice: Subject to any disclaimer, the term of this patent is extended or adjusted under 35 U.S.C. 154(b) by 74 days.

(21) Appl. No.: 17/042,063

(22) PCT Filed: Aug. 15, 2019

(86) PCT No.: PCT/NL2019/050533
§ 371 (c)(1),
(2) Date: Sep. 25, 2020

(87) PCT Pub. No.: WO2020/036490
PCT Pub. Date: Feb. 20, 2020

(65) Prior Publication Data
US 2021/0142112 A1    May 13, 2021

(30) Foreign Application Priority Data

Aug. 17, 2018 (NL) ...................................... 2021481
Aug. 24, 2018 (NL) ...................................... 2021498

(51) Int. Cl.
*G06K 9/62* (2022.01)
*G06K 9/00* (2022.01)
(Continued)

(52) U.S. Cl.
CPC ......... *G06K 9/6257* (2013.01); *G06K 7/0021* (2013.01); *G06K 7/10366* (2013.01);
(Continued)

(58) Field of Classification Search
CPC ............... G06K 9/6257; G06K 7/0021; G06K 7/10366; G06K 7/10722; G06K 7/1413;
(Continued)

(56) References Cited

U.S. PATENT DOCUMENTS 10,025,950 B1 * 7/2018 Avasarala ............ G06V 10/454
2003/0164878 A1    9/2003 Iizaka

FOREIGN PATENT DOCUMENTS

EP         1212939 A1    6/2002
WO    2013085985 A1    6/2013
(Continued)

*Primary Examiner* — David F Dunphy
(74) *Attorney, Agent, or Firm* — AEON Law, PLLC; Adam L. K. Philipp; David V. H. Cohen (57) ABSTRACT

The invention relates to a method for training a machine learning model to identify a subject having at least one machine readable identifier providing a subject ID, said method comprising:
providing a computer vision system with an image capturing system comprising at least one image capturing device, and a reader system comprising at least one reader for reading said at least one machine readable identifier;
defining said machine learning model in said computer vision system;
capturing a first image using said image capturing system, said first image showing said subject;
reading said subject ID using said reader system when capturing said first image, and linking said subject ID with said first image, said linking providing said first image with a linked subject ID, providing a first annotated image;

(Continued)

capturing at least one further image showing said subject, linking said linked subject ID to said at least one further image providing at least one further annotated image, and subjecting said first annotated image and said at least one further annotated image to said machine learning model for training said machine learning model.

17 Claims, 7 Drawing Sheets

(51) Int. Cl.
| | | |
|---|---|---|
| G06K 7/14 | (2006.01) | |
| G06K 7/00 | (2006.01) | |
| G06N 20/00 | (2019.01) | |
| G06K 7/10 | (2006.01) | |
| G06V 20/52 | (2022.01) | |
| G06V 40/10 | (2022.01) | |

(52) U.S. Cl.
CPC ....... *G06K 7/10722* (2013.01); *G06K 7/1413* (2013.01); *G06K 9/6262* (2013.01); *G06N 20/00* (2019.01); *G06V 20/53* (2022.01); *G06V 40/103* (2022.01)

(58) Field of Classification Search
CPC .... G06K 9/6262; G06N 20/00; G06V 40/103; G06V 20/53
See application file for complete search history.

(56) References Cited

FOREIGN PATENT DOCUMENTS

| | | | | |
|---|---|---|---|---|
| WO | 2015149610 A1 | 10/2015 | | |
| WO | WO 2016/044442 | * | 3/2016 | ............. G06Q 50/10 |

* cited by examiner

FIG 5C

METHOD AND SYSTEM FOR AUTOMATICALLY ANNOTATING AND IDENTIFYING A LIVING BEING OR AN OBJECT WITH AN IDENTIFIER PROVIDING A SUBJECT IDENTIFICATION

FIELD OF THE INVENTION

The invention relates to a method, device, system, computer product, a data carrier and a computer program product to annotate and identify living beings or objects with RFID and computer vision technology.

BACKGROUND OF THE INVENTION

Artificial intelligence (AI) is developing rapidly and AI applications are supporting or will support all industries including the aerospace industry, agriculture, chemical industry, computer industry, construction industry, defense industry, education industry, energy industry, entertainment industry, financial services industry, food industry, health care industry, hospitality industry, information industry, manufacturing, mass media, mining, telecommunication industry, transport industry, water industry and direct selling industry.

Human-machine communication becomes more and more important. Machines (such as computers, smartphones, tablets and robots) are penetrating society rapidly.

Computer vision is an area of AI wherein machine learning is used to classify living beings and objects in images. Training a machine learning model for computer vision involves providing a training set with annotated images. Often a large number of images need to be annotated manually to establish a computer vision system with sufficient accuracy. Automatic annotation, instead of manual annotation, of living beings and objects in images can reduces the time and costs of annotation dramatically.

In "Automatic Image Annotation via Label Transfer in the Semantic Space", May 2016, by Tiberio Uricchio et al. (https://arxiv.org/abs/1605.04770) according to its abstract describes "Automatic image annotation is among the fundamental problems in computer vision and pattern recognition, and it is becoming increasingly important in order to develop algorithms that are able to search and browse large-scale image collections. In this paper, we propose a label propagation framework based on Kernel Canonical Correlation Analysis (KCCA), which builds a latent semantic space where correlation of visual and textual features are well preserved into a semantic embedding. The proposed approach is robust and can work either when the training set is well annotated by experts, as well as when it is noisy such as in the case of user-generated tags in social media. We report extensive results on four popular datasets. Our results show that our KCCA-based framework can be applied to several state-of-the-art label transfer methods to obtain significant improvements. Our approach works even with the noisy tags of social users, provided that appropriate denoising is performed. Experiments on a large scale setting show that our method can provide some benefits even when the semantic space is estimated on a subset of training images."

US20070086626, with title "Individual identity authentication systems", according to its abstract describes "A single image from a camera (14) is captured of an individual (40) seeking entry through a door held by a door latch (24). An image processor (16) looks for and locates a tag (42) worn by the individual (40) in the image and reads an identification (ID) code from the tag (42). A comparator (20) compares this ID code with ID codes in an identification database (22) to find a match. Once a match of ID codes is found, the image processor (16) looks for and locates a face (44) of the individual (40) in the image and extracts facial features from the face (44). The comparator (20) compares the extracted facial features with facial features associated with the matched ID code, from the identification database (22), to find a match. Once there is a match of facial features, the door latch (24) is released."

In "Automatic image annotation and retrieval using cross-media relevance model", July 2003, by J. Jeon et al. (http://hpds.ee.kuas.edu.tw/download/parallel_processing/97/97present/20081226/Automatic%20Image%20Annotation%20and-%20Retrieval%20using.pdf) according to its abstract describes "Libraries have traditionally used manual image annotation for indexing and then later retrieving their image collections. However, manual image annotation is an expensive and labor intensive procedure and hence there has been great interest in coming up with automatic ways to retrieve images based on content. Here, we propose an automatic approach to annotating and retrieving images based on a training set of images. We assume that regions in an image can be described using a small vocabulary of blobs. Blobs are generated from image features using clustering. Given a training set of images with annotations, we show that probabilistic models allow us to predict the probability of generating a word given the blobs in an image. This may be used to automatically annotate and retrieve images given a word as a query. We show that relevance models allow us to derive these probabilities in a natural way. Experiments show that the annotation performance of this cross-media relevance model is almost six times as good (in terms of mean precision) than a model based on word-blob co-occurrence model and twice as good as a state of the art model derived from machine translation. Our approach shows the usefulness of using formal information retrieval models for the task of image annotation and retrieval."

U.S. Pat. No. 8,380,558, with title "Method and system for analyzing shopping behavior in a store by associating RFID data with video-based behavior and segmentation data", according to its abstract describes "The present invention is a method and system for analyzing shopping behavior by associating RFID data, such as tracking data by the RFID tag identifications, with video-based behavior and segmentation data, such as behavior analysis and demographic composition analysis of the customers, utilizing a plurality of means for sensing and using RFID tags, a plurality of means for capturing images, and a plurality of computer vision technologies. In the present invention, the association can further comprise the association of the RFID with the transaction data or any time-based measurement in the retail space. The analyzed shopping behavior in the present invention helps people to better understand business elements in a retail space. It is one of the objectives of the present invention to provide an automatic video-based segmentation of customers in the association with the RFID based tracking of the customers, based on a novel usage of a plurality of means for capturing images and a plurality of computer vision technologies on the captured visual information of the people in the retail space. The plurality of computer vision technologies can comprise face detection, person tracking, body parts detection, and demographic classification of the people, on the captured visual information of the people in the retail space."

CN107066605, with title "Image identification-based device information automatic retrieval and display method", according to its abstract describes "The invention relates to an image identification-based device information automatic retrieval and display method. The method is mainly and technically characterized by comprising the following steps of establishing a real scene map of a substation; obtaining a view angle picture of the position of a browser, and identifying a device type of a device contained in the picture in real time; obtaining a monitoring information account corresponding to the device type; and dynamically displaying the monitoring information account on the real scene map. By adopting the method, a user does not need to perform manual annotation; the information retrieval is performed according to the device type automatically identified in the picture and a device ID; and the information display is more intelligent and quicker."

In "Attention-based Deep Multiple Instance Learning", February 2018, by Maximilian Ilse et al. (https://arxiv.org/abs/1802.04712) according to its abstract describes "Multiple instance learning (MIL) is a variation of supervised learning where a single class label is assigned to a bag of instances. In this paper, we state the MIL problem as learning the Bernoulli distribution of the bag label where the bag label probability is fully parameterized by neural networks. Furthermore, we propose a neural network-based permutation-invariant aggregation operator that corresponds to the attention mechanism. Notably, an application of the proposed attention-based operator provides insight into the contribution of each instance to the bag label. We show empirically that our approach achieves comparable performance to the best MIL methods on benchmark MIL datasets and it outperforms other methods on a MNIST-based MIL dataset and two real-life histopathology datasets without sacrificing interpretability."

SUMMARY OF THE INVENTION

In order to train a machine learning (ML) model for computer vision, often a training set with a large number of annotated images should be provided. Annotating images manually is a tedious job. Annotating images automatically is saving resources and therefore efficient but is often lacking the accuracy for training a ML model when a high reliability of the model is required.

Hence, it is an aspect of the invention to provide an improved and/or alternative method for annotating images which automates the annotating process and preferably further, at least partly, obviates one or more of above-described drawbacks, in particular by increasing the accuracy of the labeled data by automatic annotation.

The method according to the invention allows AI systems to improve over time due to the increasing availability of labelled or annotated data. In many cases it would not be necessary anymore to pre-train a ML model anymore for a specific application. There is provided a method for training a machine learning model to identify a subject having at least one machine readable identifier providing a subject ID, said method comprising:

providing a computer vision system with an image capturing system comprising at least one image capturing device, and a reader system comprising at least one reader for reading said at least one machine readable identifier;

defining said machine learning model in said computer vision system;

capturing a first image using said image capturing system, said first image showing said subject;

reading said subject ID using said reader system when capturing said first image, and linking said subject ID with said first image, said linking providing said first image with a linked subject ID, providing a first annotated image;

capturing at least one further image showing said subject, linking said linked subject ID to said at least one further image providing at least one further annotated image, and subjecting said first annotated image and said at least one further annotated image to said machine learning model for training said machine learning model.

There is further provided a system for identifying a subject having at least one machine readable identifier providing a subject ID, said system comprising:

a computer vision system comprising an image capturing system comprising at least one image capturing device, and a reader system comprising at least one reader for reading said at least one machine readable identifier;

a machine learning model defined in said computer vision system;

said computer vision system in operation:

capturing a first image using said image capturing system, said image showing said subject;

reading said subject ID using said reader system when capturing said first image, and linking said subject ID with said first image, said linking providing said first image with a linked subject ID, providing a first annotated image;

capturing at least one further image showing said subject, linking said linked subject ID to said at least one further image providing at least one further annotated image, and subjecting said first annotated image and said at least one further annotated image to said machine learning model for training said machine learning model.

A subject can be an animal, a person or an object. A product is an example of an object.

A reader is a device for reading machine readable identifiers. A reader can consist of an antenna to receive a signal. Examples of readers are a RFID reader, a barcode scanner/camera, QR scanner/camera, chip and pin card reader, biometric reader (such as for fingerprint and iris recognition) and audio analyzer (for voice and sound recognition).7

An image capturing device is a device that can provide an image, in particular a digital image or digital picture. Such a device can comprise a camera of a filming device. Examples are devices comprising a CCD or similar imaging elements. As such, these devices are known to a skilled person.

In order to detect and localize a subject in a scene from a captured image an embodiment uses a method to detect subjects. Such a method will use machine learning techniques (mainly deep learning) to design and train a model which detects subjects given an input of a visual representation, e.g. an RGB image, as the system perceives. The model is trained on a large amount of annotated data; it comprises images with and without subjects and locations of the subjects are annotated.

In the case of deep learning, a detection framework such as Faster-RCNN, SSD, R-FCN, Mask-RCNN, or one of their derivatives can be used. A base model structure can be VGG, AlexNet, ResNet, GoogLeNet, adapted from the previous, or a new one. A model can be initialized with weights and trained similar tasks to improve and speedup the training. Optimizing the weights of a model, in case of deep learning, can be done with the help of deep learning frameworks such as Tensorflow, Caffe, or MXNET. To train a model, optimization methods such as Adam or RMSProb can be used. Classification loss functions such Hinge Loss or Softmax Loss can be used. Other approaches which utilize handcrafted features (such as LBP, SIFT, or HOG) and conventional classification methods (such as SVM or Random Forest) can be used.

In an embodiment, after localizing subjects in a scene from captured images, trained multiple instance neural networks (MINN) are used to match the correct subject IDs with subjects.

In an embodiment, after localizing subjects in a scene from retrieved images, a deep neural network (DNN) is trained to compare subjects from different captured images with each other in order to detect similar subjects.

In order to detect similar subjects from different captured images, an embodiment uses machine learning techniques (mainly deep learning) to design and train a model which detects the similarity of subjects, given an input of a visual representation, e.g. RGB images, as the system perceives. The model is trained on a large amount of annotated data; it comprises images of subjects wherein similar subjects the are annotated.

For example, a pretrained DNN on ImageNet, e.g. VGG-Net, AlexNet, ResNet, Inception and Xception, can be adapted by taking the convolution layers from these pretrained DNN networks, and on top of them adding new layers specially designed for detecting similar subjects, and train the network as described in the previous paragraph.

In case similar subjects are detected with sufficient reliability, the subject in the different captured images are automatically annotated with one or more subject IDs which are consistent with the session IDs retrieved by a reader system for the captured images. For example, if there is a similar subject detected in both captured image A and captured image B while for these images multiple subject IDs have been retrieved, then the similar subject in both image A and image B will automatically be annotated with the section of the subject IDs belonging to the subject IDs of image A and of image B.

A series of subject IDs that are linked to an image can define a subject ID vector. If for instance in an embodiment a series of images are captured and a series of linked subject ID vectors are defined, then using statistical analysis, for instance using probability analysis, the system provides at least part of the subjects in these images each with a unique subject ID. Thus, in fact, a space of images, subjects and subject IDs is being orthogonalized.

In an embodiment, the method further comprises providing said subject with said machine readable identifier providing a subject ID. In an embodiment of this, the subject is provided with a machine readable object, for instance a chipcard, an RFID tag, an NFC device, and the like.

In an embodiment, when capturing said at least one further image, a further subject ID is read using said reader system and said further subject ID is linked to said at least one further image.

In an embodiment, said first annotated image and said at least one further annotated image are included in a training dataset that is built during performing said method, and said training dataset is used for at least one of training and additionally training said machine learning model.

In an embodiment, the machine learning model comprises a machine learning model part for localizing subjects in at least one of said captured first image and said captured at least one further image.

In an embodiment, the reader system comprises at least a first reader and a second reader, wherein said first reader reads said subject ID when said first image is captured, and said second reader reads said subject ID when said at least one further image is captured.

In an embodiment, the subject comprises at least a first and a second machine readable identifier, said first reader reads said first machine readable identifier for providing said subject ID, and said second reader reads said second machine readable identifier for providing said subject ID.

In an embodiment, the first and second reader and said first and a second machine readable identifier are of a different type, wherein said first and second reader provide a first and second identifier, and in particular said vision system provides said subject ID from said first and second identifier. For instance, the first reader is an RFID reader and the second reader is a chip card reader.

In an embodiment, at least one selected from said linked subject ID and a further subject ID is repeated.

In an embodiment, the capturing said at least one further image and linking said linked subject ID to said at least one further image continuously repeated, providing a series of further annotated images comprising at least said further annotated image, in particular said capturing is repeated when there is one or more subject in a field of view of said image capturing system In an embodiment, the capturing said at least one further image is continuously repeated, and said reader system repeats reading said subject ID using said reader system when a said at least one further image is captured, providing each time a renewed subject ID, linking said renewed subject ID with said at least one further image, said linking providing said at least one further image with a linked subject ID, resulting in at least one further annotated image, for providing a series of annotated images.

In an embodiment, the annotating images is continued until a predetermined reliability level for identifying said subject in an image is reached.

In an embodiment, the method further is for training a machine learning model to identify a plurality of subject each having at least one machine readable identifier providing a subject ID for each subject, wherein said reader system reads said machine readable identifiers of at least part of said plurality of subjects, providing a series of subject IDs, said image capturing system captures said first image with said at least part of said plurality of subjects and, and links said first image with said at least part of said plurality of subjects with said series of subject IDs, providing said first annotated image. In an embodiment, the image capturing system captures said at least one further image with said at least part of said plurality of subjects and, and links said at least one further image with said at least part of said plurality of subjects with said series of subject IDs, providing said at least one further annotated image.

The method is in an embodiment further provided for training a machine learning model to identify an animal among a group of animals, in particular a livestock animal amidst a group of livestock animals, using the method described above.

There is further provided a computer program product for running on a data processor on a computer vision system, wherein said computer program product when running on said data processor:

enables said computer vision system to perform the method described above.

The term "statistically" when used herein, relates to dealing with the collection, analysis, interpretation, presentation, and organization of data. In particular, it comprises modelling behavior of a population. Using probability distributions, a probability of optimizing transmission reliability is calculated and predicted.

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

The term "functionally" will be understood by, and be clear to, a person skilled in the art. The term "substantially" as well as "functionally" may also include embodiments with "entirely", "completely", "all", etc. Hence, in embodiments the adjective functionally may also be removed. When used, for instance in "functionally parallel", a skilled person will understand that the adjective "functionally" includes the term substantially as explained above. Functionally in particular is to be understood to include a configuration of features that allows these features to function as if the adjective "functionally" was not present. The term "functionally" is intended to cover variations in the feature to which it refers, and which variations are such that in the functional use of the feature, possibly in combination with other features it relates to in the invention, that combination of features is able to operate or function. For instance, if an antenna is functionally coupled or functionally connected to a communication device, received electromagnetic signals that are receives by the antenna can be used by the communication device. The word "functionally" as for instance used in "functionally parallel" is used to cover exactly parallel, but also the embodiments that are covered by the word "substantially" explained above. For instance, "functionally parallel" relates to embodiments that in operation function as if the parts are for instance parallel. This covers embodiments for which it is clear to a skilled person that it operates within its intended field of use as if it were parallel.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device or apparatus claims enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DESCRIPTION OF PREFERRED EMBODIMENTS

Figure 1:
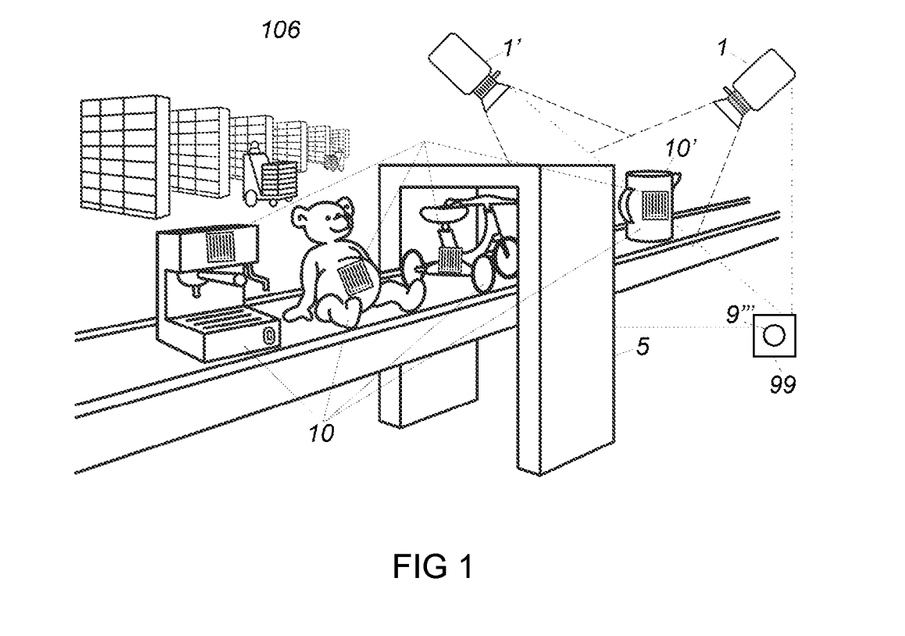
FIG. 1 schematically depicts an embodiment for training a machine learning model to identify products labeled with a barcode.

FIG. 1 schematically depicts an embodiment in a warehouse 106 for training a machine learning model 9''', defined in a computer vision system 99, to identify products 10 labeled with a barcode as subject ID. The computer vision system 99 is operationally coupled with scanner 5 and cameras 1 and 1'. The barcode of the products 10 are scanned by scanner 5 and the cameras 1 and 1' capture images of the products 10. A first annotated image of product 10' captured by camera 1, comprising a scanned barcode of product 10', is subjected to machine learning model 9'''. A further annotated image of product 10' captured by camera 1', comprising a scanned barcode of product 10', is also subjected to machine learning model 9'''. Product 10' in the captured images is automatically labeled or annotated with a unique subject ID belonging to its barcode. Machine learning model 9''' that is trained in this way can thus be applied to identify product 10'.

In another embodiment scanner 5 is omitted and the camera 1 is provided with a barcode recognition system.

Therefore, while capturing a first image of product 10', camera 1 reads also the barcode of product 10'. In this example, it is clarified that "while capturing" includes reading a subject ID instants before or after actual capturing the image. Important aspect is that a time window around the actual image capturing is regarded to make sure that the subjects in an image or picture are still capable of having their subject-IDs read, in order to have a valid link between subject IDs that are read and the subjects in an image, picture or even film part.

Figure 2A:
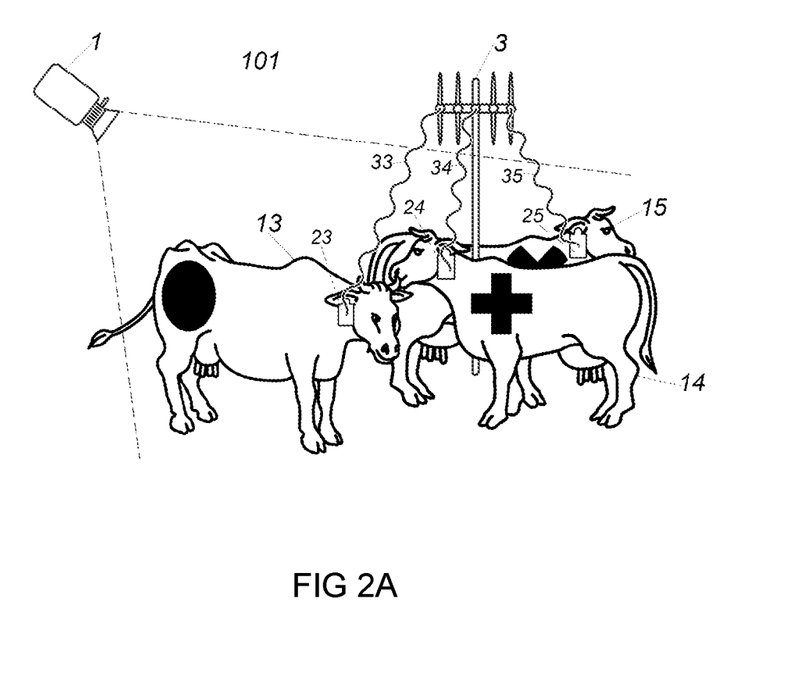
FIGS. 2A-2C schematically depict an embodiment for training a machine learning model to identify cows earmarked with a RFID chip.
Figure 2B:
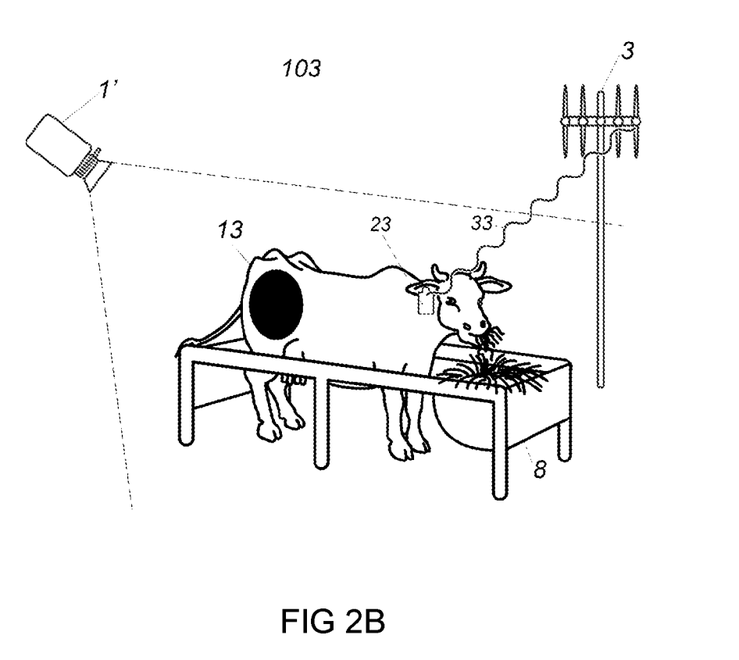
Figure 2C:
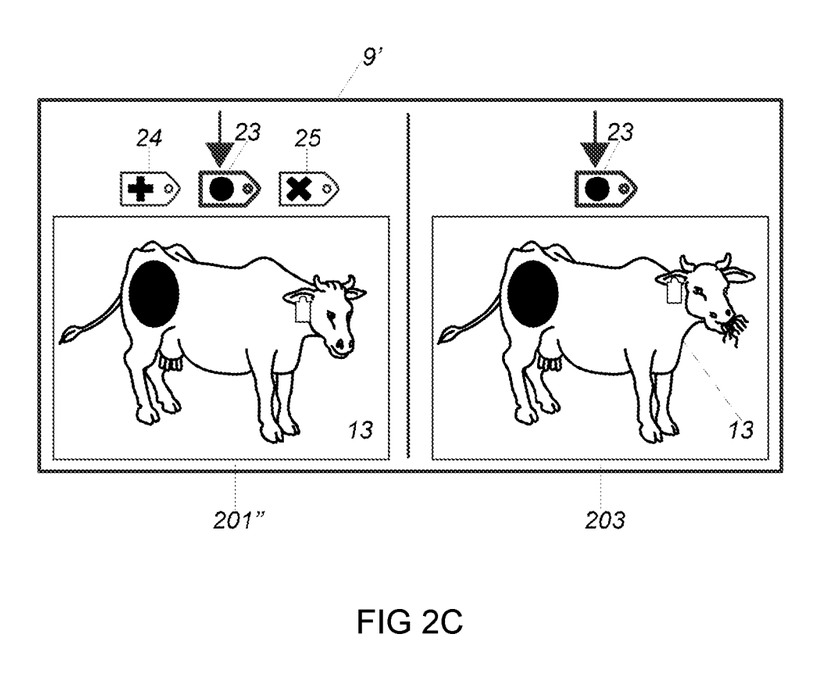

FIG. 2A-2C schematically depicts an embodiment, at a farmyard 101 and 103, for training a machine learning model 9', defined in a computer vision system, to identify cow 13 among cows 14 and 15. Cow 13 is earmarked with a RFID chip 23, cow 14 is earmarked with a RFID chip 24 and cow 15 is earmarked with a RFID chip 25. The signals 33, 34 and 35, belonging respectively to the RFID chips 23, 24 and 25, comprise a unique subject IDs for respectively cow 13, 14 and 15. Antennas 3 and 3' are operationally coupled to a RFID reader. The RFID reader, camera 1 and 1' are operationally coupled to the computer vision system.

In FIG. 2A, the three cows 13, 14 and 15 are grouped at a farmyard 101. The signals 33, 34, and 35 are being received by antenna 3. Camera 1 captured a first image of the cows 13, 14 and 15. A first annotated image 201" (FIG. 2C) captured by camera 1, comprising the subject IDs of cow 13, 14 and 15, is subjected to the machine learning model 9'.

In FIG. 2B, cow 13 is eating at a cratch 8 in a designated area at a farmyard 103. The signal 33 is being received by antenna 3. Camera 1' captured a further image of cow 13. A further annotated image 203 (FIG. 2C) captured by camera 1', comprising the unique subject ID of cow 13, is subjected to the machine learning model 9'.

In FIG. 2C, cow 13 in the first annotated image 201" and cow 13 in the further annotated image 203 are thus automatically labeled or annotated with the unique subject ID belonging to RFID chip 23 (marked with an arrow) which is in section of subject IDs of annotated image 201" and 203. Machine learning model 9' that is trained in this way can thus be applied to identify cow 13 in an image.

In practice, the computer vision system will continuously capture images of one or more cows and read subject IDs. These will be automatically linked to provide annotated images and applied to the machine learning model 9'. In this way, the machine learning model 9' can be (additionally) trained and improved. If the machine learning model 9' qualifies the annotated image as being below a predefined threshold, the annotated image may be disregarded in the training process, and/or the annotated image may even be removed from the system.

Figure 3A:
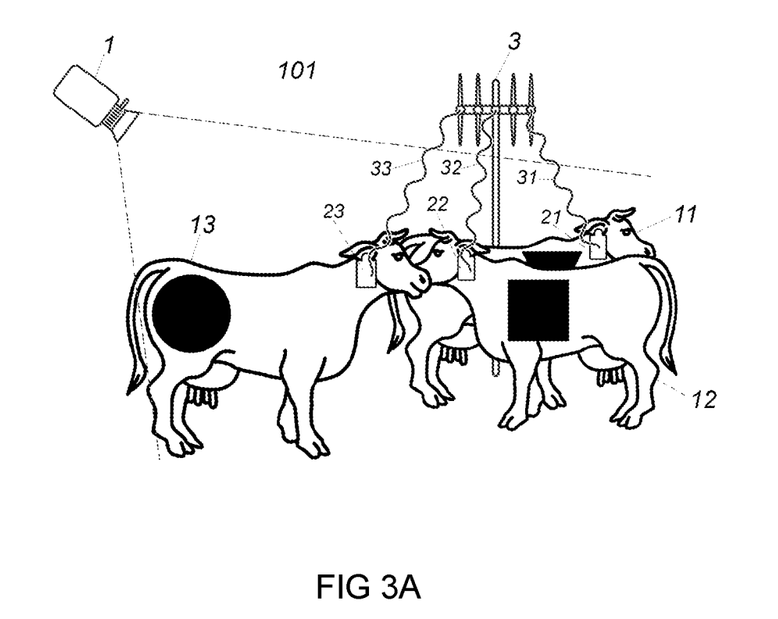
FIGS. 3A-3C schematically depict another embodiment for training a machine learning model to identify cows earmarked with a RFID chip.
Figure 3B:
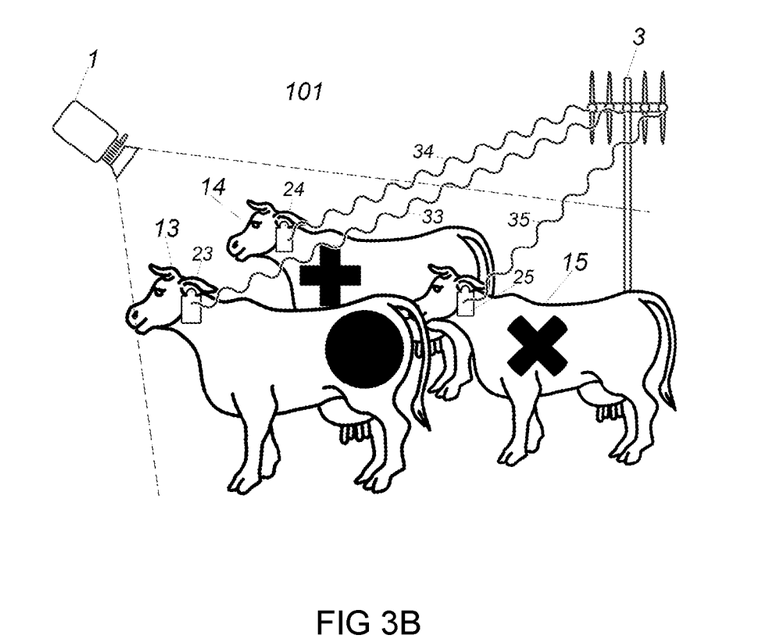
Figure 3C:
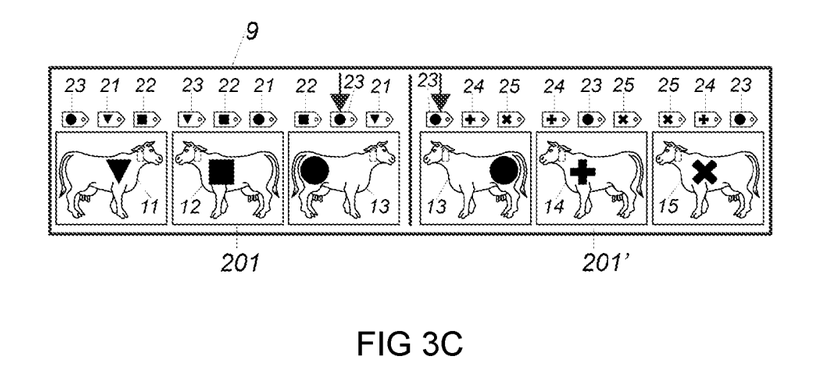

FIG. 3A-3C schematically depicts an embodiment, at a farmyard 101, for training a machine learning model 9, defined in a computer vision system, to identify cow 13 among cows 11, 12, 13, 14 and 15. Cow 11 is earmarked with a RFID chip 21, cow 12 is earmarked with a RFID chip 22, cow 13 is earmarked with a RFID chip 23, cow 14 is earmarked with a RFID chip 24 and cow 15 is earmarked with a RFID chip 25. The signals 31, 32, 33, 34 and 35, belonging respectively to the RFID chips 21, 22, 23, 24 and 25, comprise a unique subject IDs for respectively cow 11, 12, 13, 14 and 15. Antennas 3 is operationally coupled to a RFID reader. The RFID reader and camera 1 are operationally coupled to the computer vision system.

In FIG. 3A, the three cows 11, 12 and 13 are grouped at a farmyard 101. The signals 31, 32, and 33 are being received by antenna 3. Camera 1 captured a first image of the cows 11, 12 and 13. A first annotated image 201 (FIG. 3C) captured by camera 1, comprising the subject IDs of cow 11, 12 and 13, is subjected to the machine learning model 9.

In FIG. 3B, the three cows 13, 14 and 15 are grouped at a farmyard 101. The signals 33, 34, and 35 are being received by antenna 3. Camera 1 captured a further image of the cows 13, 14 and 15. A further annotated image 201' (FIG. 3C) captured by camera 1, comprising the subject IDs of cow 13, 14 and 15, is subjected to the machine learning model 9.

In FIG. 3C, cow 13 in the first annotated image 201 and cow 13 in the further annotated image 201' are thus automatically labeled or annotated with the unique subject ID belonging to RFID chip 23 (marked with an arrow) which is in section of subject IDs of annotated image 201 and 201'. Machine learning model 9 that is trained in this way can thus be applied to identify cow 13 in an image.

The RFID chip can either be active or passive.

Figure 4A:
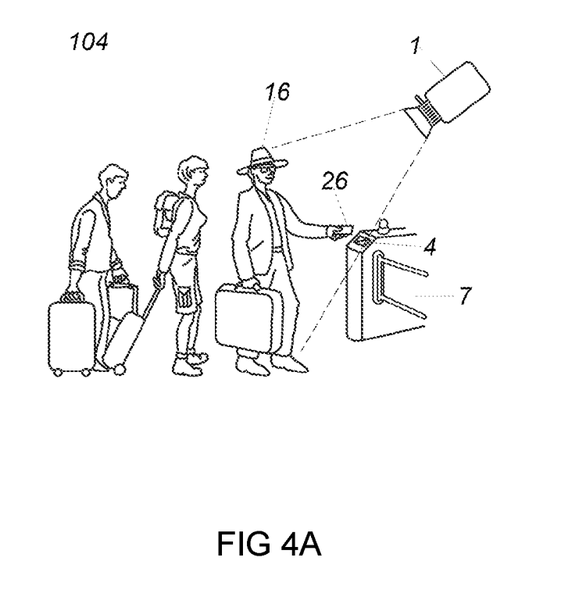
FIGS. 4A-4C schematically depicts an embodiment for training a machine learning model to identify travelers using a boarding pass, and FIGS. 5A-5C schematically depict an embodiment for training a machine learning model to identify a woman identifying herself at different locations.
Figure 4B:
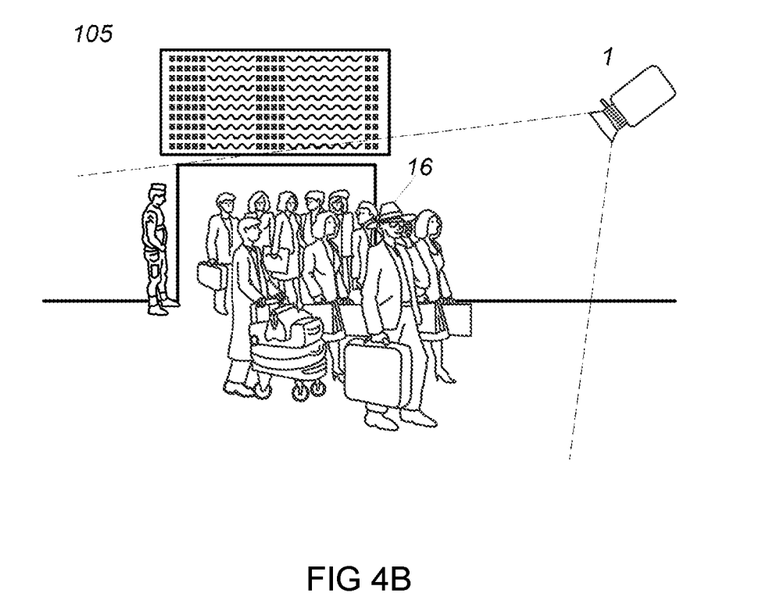
Figure 4C:
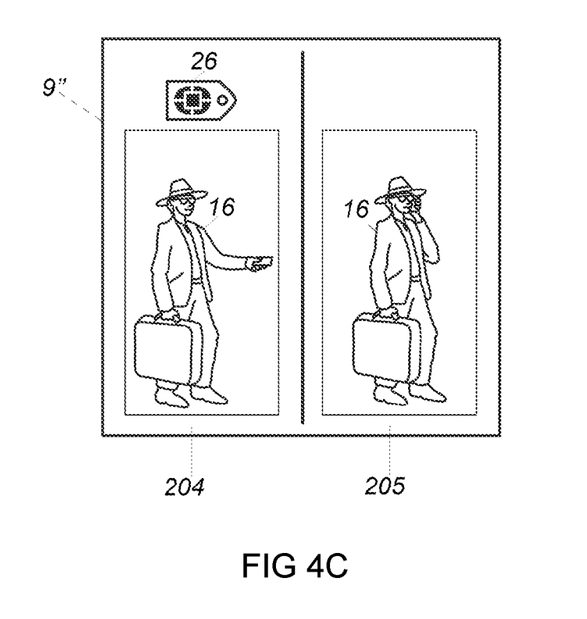

FIG. 4A-4C schematically depicts an embodiment, at airport halls 104 and 105, for training a machine learning model 9", defined in a computer vision system, to identify a person 16 among a crowd. Person 16 is carrying a chip card 26. The chip card 26 comprises a unique subject IDs for person 16. Chip card reader 4 and camera 1 are operationally coupled to the computer vision system.

In FIG. 4A, person 16 is in the process of entering the airport in airport hall 104 by unlocking turn style 7, by putting his chip card 26 in card reader 4. Camera 1 captured a first image of person 16. A first annotated image 204 (FIG. 4C) captured by camera 1, comprising the subject ID of person 16, is subjected to the machine learning model 9".

In FIG. 4B, person 16 is walking in an airport hall 105. Camera 1 captured a further image of person 16. A further image 205 (FIG. 4C) captured by camera 1 is subjected to the machine learning model 9".

In FIG. 4C, person 16 in the first annotated image 204 and person 16 in the further image 205 are automatically labeled or annotated with the unique subject ID belonging to chip card 26 since person 16 in annotated image 204 and image 205 are detected as to be likely similar. Machine learning model 9" that is trained in this way can thus be applied to identify person 16 in an image.

Figure 5A:
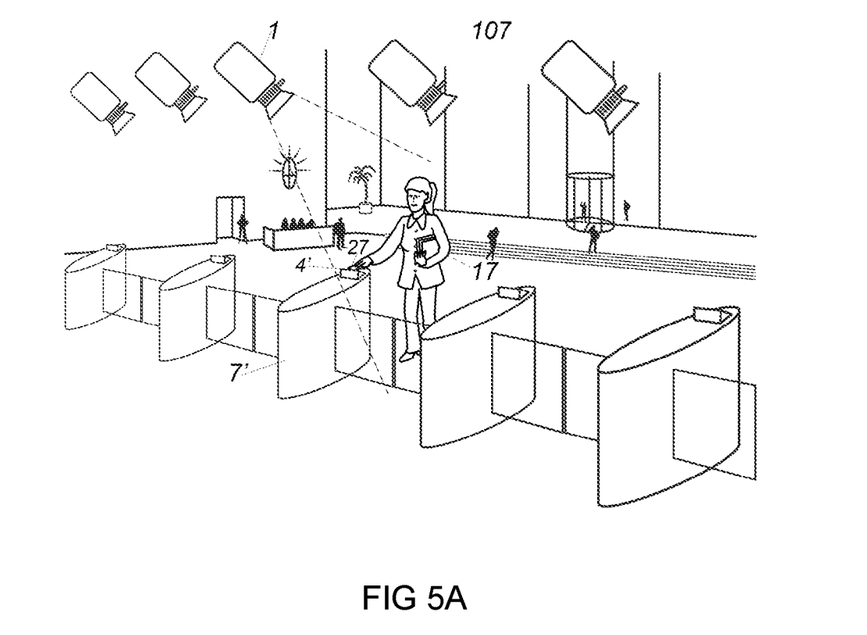
Figure 5B:
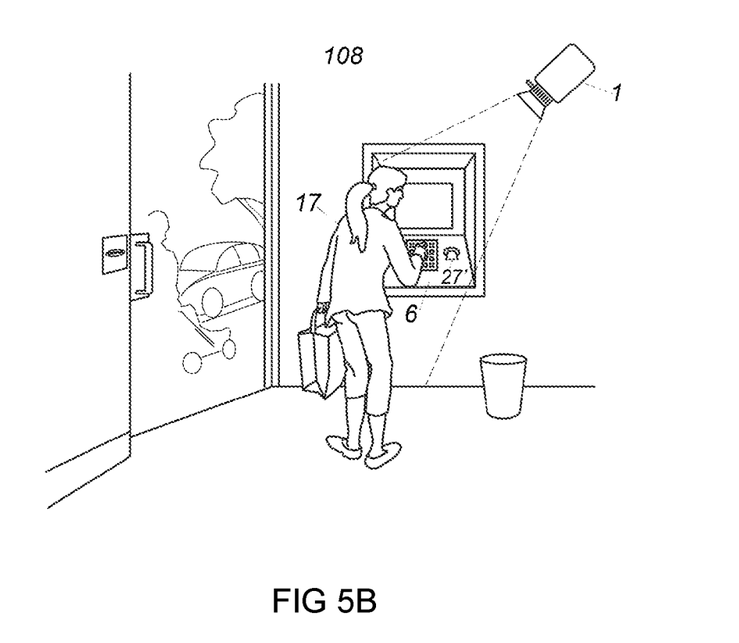
Figure 5C:
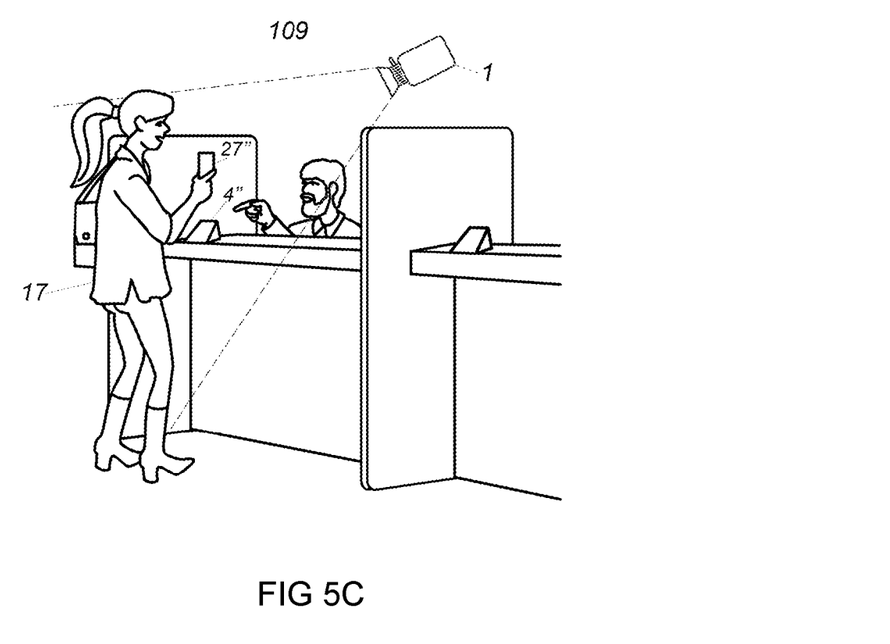

FIG. 5A-5C schematically depicts an embodiment for training a machine learning model to identify a woman 17 identifying herself at different locations 107, 108 and 109, for training a machine learning, defined in a computer vision system, to identify a woman 17 in various situations. Turn style 7' with fingerprint reader 4', ATM cash machine 6 with a bank card reader, ID card reader 4" and image capturing device 1 are operationally coupled to the computer vision system. Annotated images captured by device 1 are being subjected to the machine learning model to train to machine learning model.

Woman 17 is uniquely identified by various readers while images of her are captured by image capturing devices 1 providing annotated images of woman 17.

In FIG. 5A, woman 17 in an office entrance 107 identifies herself at turn style 7' by putting her finger 27 on a fingerprint reader 4', providing a subject ID, while image capturing device 1 captures at least one image of woman 17 comprising a first image. The subject ID provided by finger 27 is being linked to the first image that provides a first annotated image. Possibly device 1 captures a series of images comprising the first image and at least one further image. In such an embodiment the subject ID is also being linked to the at least on further image that provides a at least one further annotated image.

In FIG. 5B, woman 17, in a designated area 108, withdraws cash from an ATM cash machine 6 with a bank card reader, and identifies herself by a bank card 27' and by typing her pin code on the ATM cash machine, providing a subject ID, while image capturing device 1 captures at least one further image of woman 17. The subject ID provided by bank card 27' is being linked to the at least one further image that provides a at least one further annotated image.

In FIG. 5C, woman 17 in a town hall 109 identifies herself at a counter by showing her ID card 27" to an ID card reader 4", providing a subject ID, while image capturing device 1 captures at least one further image of woman 17. The subject ID provided by ID card 27" is being linked to the at least one further image that provides a at least one further annotated image.

In further embodiments the reading of a one or more subject IDs while capturing a first image providing a first annotated image and capturing further images providing further annotated images can occur at various locations at different moments in time.

It will also be clear that the above description and drawings are included to illustrate some embodiments of the invention, and not to limit the scope of protection. Starting from this disclosure, many more embodiments will be evident to a skilled person. These embodiments are within the scope of protection and the essence of this invention and are obvious combinations of prior art techniques and the disclosure of this patent.

The invention claimed is:

1. A method for training a machine learning model to identify a subject having at least one machine readable identifier providing a subject ID, said method comprising:
    providing a computer vision system with an image capturing system comprising at least one image capturing device, and a reader system comprising at least one reader for reading said at least one machine readable identifier;
    defining said machine learning model in said computer vision system;
    capturing a first image using said image capturing system, said first image showing said subject;
    reading said subject ID using said reader system when capturing said first image, and linking said subject ID with said first image, said linking providing said first image with a linked subject ID, providing a first annotated image;
    capturing at least one further image showing said subject, linking said linked subject ID to said at least one further image providing at least one further annotated image, and
    subjecting said first annotated image and said at least one further annotated image to said machine learning model for training said machine learning model.

2. The method of claim 1, further comprising providing said subject with said machine readable identifier providing said subject ID.

3. The method of claim 1, wherein when capturing said at least one further image, a further subject ID is read using said reader system and said further subject ID is linked to said at least one further image.

4. The method of claim 1, wherein said first annotated image and said at least one further annotated image are included in a training dataset that is built during performing said method, and said training dataset is used for at least one of training and additionally training said machine learning model.

5. The method of claim 1, wherein said machine learning model comprises a machine learning model part for localizing subjects in at least one of said captured first image and said captured at least one further image.

6. The method of claim 1, wherein said reader system comprises at least a first reader and a second reader, wherein said first reader reads said subject ID when said first image is captured, and said second reader reads said subject ID when said at least one further image is captured.

7. The method of claim 6, wherein said subject comprises at least a first and a second machine readable identifier first reader reads said first machine readable identifier for providing said subject ID and said second reader reads said second machine readable identifier for providing said subject ID.

8. The method of claim 1, wherein said first and second reader and said first and a second machine readable identifier are of a different type, wherein said first and second reader provide a first and second identifier, and in particular said vision system provides said subject ID from said first and second identifier.

9. The method of claim 1, wherein reading at least one selected from said linked subject ID and a further subject ID is repeated.

10. The method of claim 1, wherein said capturing said at least one further image and said linking said linked subject ID to said at least one further image continuously repeated, providing a series of further annotated images comprising at least said further annotated image, in particular said capturing is repeated when there is one or more subject in a field of view of said image capturing system.

11. The method of claim 1, wherein said capturing said at least one further image is continuously repeated, and said reader system repeats reading said subject ID using said reader system when said at least one further image is captured, providing each time a renewed subject ID, linking said renewed subject ID with said at least one further image, said linking providing said at least one further image with a linked subject ID, resulting in at least one further annotated image, for providing a series of annotated images.

12. The method of claim 1, wherein said annotating images is continued until a predetermined reliability level for identifying said subject in an image is reached.

13. The method of claim 1, for training a machine learning model to identify a plurality of said subjects each having at least one machine readable identifier providing a subject ID for each subject, wherein said reader system reads said machine readable identifiers of at least part of said plurality of subjects, providing a series of subject IDs, said image capturing system captures said first image with said at least part of said plurality of subjects and, and links said first image with said at least part of said plurality of subjects with said series of subject IDs, providing said first annotated image.

14. The method of claim 13, wherein said image capturing system captures said at least one further image with said at least part of said plurality of subjects, and links said at least one further image with said at least part of said plurality of subjects with said series of subject IDs, providing said at least one further annotated image.

15. A method for training a machine learning model to identify an animal among a group of animals, in particular a livestock animal amidst a group of livestock animals, using the method according to claim 1.

16. A system for identifying a subject having at least one machine readable identifier providing a subject ID, said system comprising:

a computer vision system comprising an image capturing system comprising at least one image capturing device, and a reader system comprising at least one reader for reading said at least one machine readable identifier;

a machine learning model defined in said computer vision system;

said computer vision system in operation:

capturing a first image using said image capturing system, said image showing said subject;

reading said subject ID using said reader system when capturing said first image, and linking said subject ID with said first image, said linking providing said first image with a linked subject ID, providing a first annotated image;

capturing at least one further image showing said subject, linking said linked subject ID to said at least one further image providing at least one further annotated image, and subjecting said first annotated image and said at least one further annotated image to said machine learning model for training said machine learning model.

17. A non-transitory computer readable medium having stored thereon computer program instructions that, when executed by a data processor on a computer vision system enables said computer vision system to perform the method of claim 1.

* * * * *